United States Patent
Lapuh et al.

(10) Patent No.: US 9,641,628 B2
(45) Date of Patent: May 2, 2017

(54) HOST DISCOVERY AND ATTACH

(71) Applicant: Avaya Inc., Santa Clara, CA (US)

(72) Inventors: Roger Lapuh, Uesslingen (CH);
Andrew John Rufene, Den Haag (NL);
Markus Nikulski, Dresden (DE)

(73) Assignee: Avaya Inc., Santa Clara, CA (US)

( * ) Notice: Subject to any disclaimer, the term of this patent is extended or adjusted under 35 U.S.C. 154(b) by 182 days.

(21) Appl. No.: 14/696,338

(22) Filed: Apr. 24, 2015

(65) Prior Publication Data

US 2016/0316026 A1    Oct. 27, 2016

(51) Int. Cl.
| | | |
|---|---|---|
| H04L 29/08 | (2006.01) | |
| H04L 29/06 | (2006.01) | |
| H04L 12/46 | (2006.01) | |
| H04L 12/721 | (2013.01) | |

(52) U.S. Cl.
CPC ......... H04L 67/16 (2013.01); H04L 69/22 (2013.01); *H04L 12/4641* (2013.01); *H04L 45/72* (2013.01); *H04L 67/327* (2013.01); *H04L 69/12* (2013.01)

(58) Field of Classification Search
CPC ..... H04L 67/16; H04L 69/22; H04L 12/5689; H04L 45/34; H04L 45/72–45/748; H04L 47/24–47/2483
See application file for complete search history.

(56) References Cited

U.S. PATENT DOCUMENTS

| | | |
|---|---|---|
| 7,173,934 B2 | 2/2007 | Lapuh et al. |
| 7,463,579 B2 | 12/2008 | Lapuh et al. |
| 7,719,958 B1 | 5/2010 | Azimi et al. |
| 7,751,329 B2 | 7/2010 | Lapuh et al. |
| 7,894,450 B2 | 2/2011 | Unbehagen et al. |
| 8,064,458 B2 | 11/2011 | Zhang et al. |
| 8,098,656 B2 | 1/2012 | Lapuh et al. |
| 8,107,382 B2 | 1/2012 | Lin et al. |
| 8,537,816 B2 | 9/2013 | Anumala et al. |
| 8,565,230 B2 | 10/2013 | Keesara et al. |
| 8,699,492 B2 | 4/2014 | Zhang et al. |
| 8,804,722 B2 | 8/2014 | Appalla et al. |
| 2011/0051730 A1* | 3/2011 | Baek ............... H04W 80/00 370/392 |
| 2011/0317588 A1 | 12/2011 | Unbehagen et al. |
| 2012/0324442 A1* | 12/2012 | Barde ............... H04L 49/70 718/1 |

(Continued)

*Primary Examiner* — Edan Orgad
*Assistant Examiner* — Saumit Shah

(57) ABSTRACT

Methods, systems and computer readable media for discovering edge devices within a network and establishing connectivity between the edge devices and one or more corresponding network services are described. In some implementations, the method can include snooping a received packet to determine whether a source entity of the received packet is known and to determine whether the received packet can be handled by a first processing layer based on a rule set in the first processing layer and configured to be accessed by the first processing layer. The method can also include classifying the packet at the first processing layer when the packet can be handled by the first processing layer, and forwarding the packet to a second processing layer when the packet cannot be handled by the first processing layer.

20 Claims, 3 Drawing Sheets

(56) References Cited

U.S. PATENT DOCUMENTS

2013/0136122 A1\* 5/2013 Keesara ............. H04L 65/4076
370/390
2014/0059155 A1\* 2/2014 Boucher ................... G06F 5/10
709/212

\* cited by examiner

HOST DISCOVERY AND ATTACH

TECHNICAL FIELD

Some implementations relate generally to computer networks, and more particularly, to methods, systems and computer readable media for discovering edge devices within a network and establishing connectivity between the edge devices and one or more corresponding network services.

BACKGROUND

Service discovery protocol suites such as mDNS, UPnP/SSDP, LLMNR have helped make discovery of devices such as printers and display devices relatively easy. Further, using zero configuration protocols and systems, client devices such as phones, tablets, and laptops can discover available printers and display devices on a network. Technologies such as these may have begun in home and small office environments, but quickly spread to large enterprises, universities and schools.

Virtualized server instances (e.g., VMs) and storage devices are being utilized in some new application deployments today. The traditional "bare metal" server approach is becoming a thing of the past. Consequently, a key problem faced by some IT departments is meeting the challenges of mapping virtualized server instances to appropriate network instances (e.g., network services). The dynamic migration capabilities of VMs can exacerbate this problem.

Different management (responsibility) domains between the server management—and the network management team may complicate the matter and require relatively complex and costly coordination. Time to service for connecting a new application to the network can typically take days instead of minutes as it should. A need may exist for a simple and effective way to ensure that applications can be quickly attached to the correct network domain.

Some implementations were conceived in light of the above mentioned needs, problems and/or limitations, among other things.

SUMMARY

Some implementations can include methods, systems and computer readable media for discovering edge devices within a network and establishing connectivity between the edge devices and one or more corresponding network services. A method can include "snooping" a received packet to determine whether a source entity of the received packet is known and to determine whether the received packet can be handled by a first processing layer based on a rule set in the first processing layer and configured to be accessed by the first processing layer.

The method can also include classifying the packet at the first processing layer when the packet can be handled by the first processing layer, and forwarding the packet to a second processing layer when the packet cannot be handled by the first processing layer. The second processing layer can include a set of predefined, but adjustable, rules which can classify the packet further to make a forward or drop decision. The method can further include identifying a source type of the received packet at the first processing layer, and determining, at the second processing layer, a predefined processing rule applicable to the received packet based on the source type of the received packet and source information of the received packet. The method can also include applying the determined rule to logically attach the source entity of the received packet with one or more network resources, and updating the rule set in the first processing layer to include the determined processing rule for the received packet. The method can further include processing the received packet in the first processing layer according to the updated first rule set.

In the method implementation described above, the snooping can include snooping with an SPB-UNI snooping interface. The source entity can include a virtual entity. The first processing layer can include a hardware fast path processing layer. The second processing layer can include a control plane processing layer. The source type can include, but is not limited to, one of VXLAN and VLAN and its virtual service identifiers.

Some implementations can include a system comprising one or more processors configured to perform operations. The operations can include snooping a received packet to determine whether a source entity of the received packet is known and to determine whether the received packet can be handled by a first processing layer based on a rule set in the first processing layer and configured to be accessed by the first processing layer. The operations can also include classifying the packet at the first processing layer when the packet can be handled by the first processing layer, and forwarding the packet to a second processing layer when the packet cannot be handled by the first processing layer. The operations can further include identifying a source type of the received packet at the first processing layer, and determining, at the second processing layer, a predefined processing rule applicable to the received packet based on the source type of the received packet and source information of the received packet.

The operations can also include applying the determined rule to logically attach the source entity of the received packet with one or more network resources, and updating the rule set in the first processing layer to include the determined processing rule for the received packet. The operations can further include processing the received packet in the first processing layer according to the updated first rule set.

In the system implementation described above, the snooping can include snooping with an SPB-UNI snooping interface. The source entity can include a virtual entity. The first processing layer can include a hardware fast path processing layer. The second processing layer can include a control plane processing layer. The source type can include one of VXLAN and VLAN.

Some implementations can include a nontransitory computer readable medium having stored thereon software instructions that, when executed by one or more processors, cause the one or more processors to perform operations. The operations can include snooping a received packet to determine whether a source entity of the received packet is known and to determine whether the received packet can be handled by a first processing layer based on a rule set associated with the first processing layer and configured to be accessed by the first processing layer. The operations can also include classifying the packet at the first processing layer when the packet can be handled by the first processing layer, and forwarding the packet to a second processing layer when the packet cannot be handled by the first processing layer. The operations can further include identifying a source type of the received packet at the first processing layer, and determining, at the second processing layer, a predefined processing rule applicable to the received packet based on the source type of the received packet and source information of the received packet.

The operations can also include applying the determined rule to logically attach the source entity of the received packet with one or more network resources, and updating the rule set in the first processing layer to include the determined processing rule for the received packet. The operations can further include processing the received packet in the first processing layer according to the updated first rule set.

In the nontransitory computer readable medium implementation described above, the snooping can include snooping with an SPB-UNI snooping interface. The source entity can include a virtual entity. The first processing layer can include a hardware fast path processing layer. The second processing layer can include a control plane processing layer. The source type can include one of VXLAN and VLAN.

Logically attaching the source entity of the received packet with one or more network resources includes logically attaching network traffic from a source network to a network service identifier (ISID). The source network can include, but is not limited to, VXLAN or VLAN.

DETAILED DESCRIPTION

Figure 1:
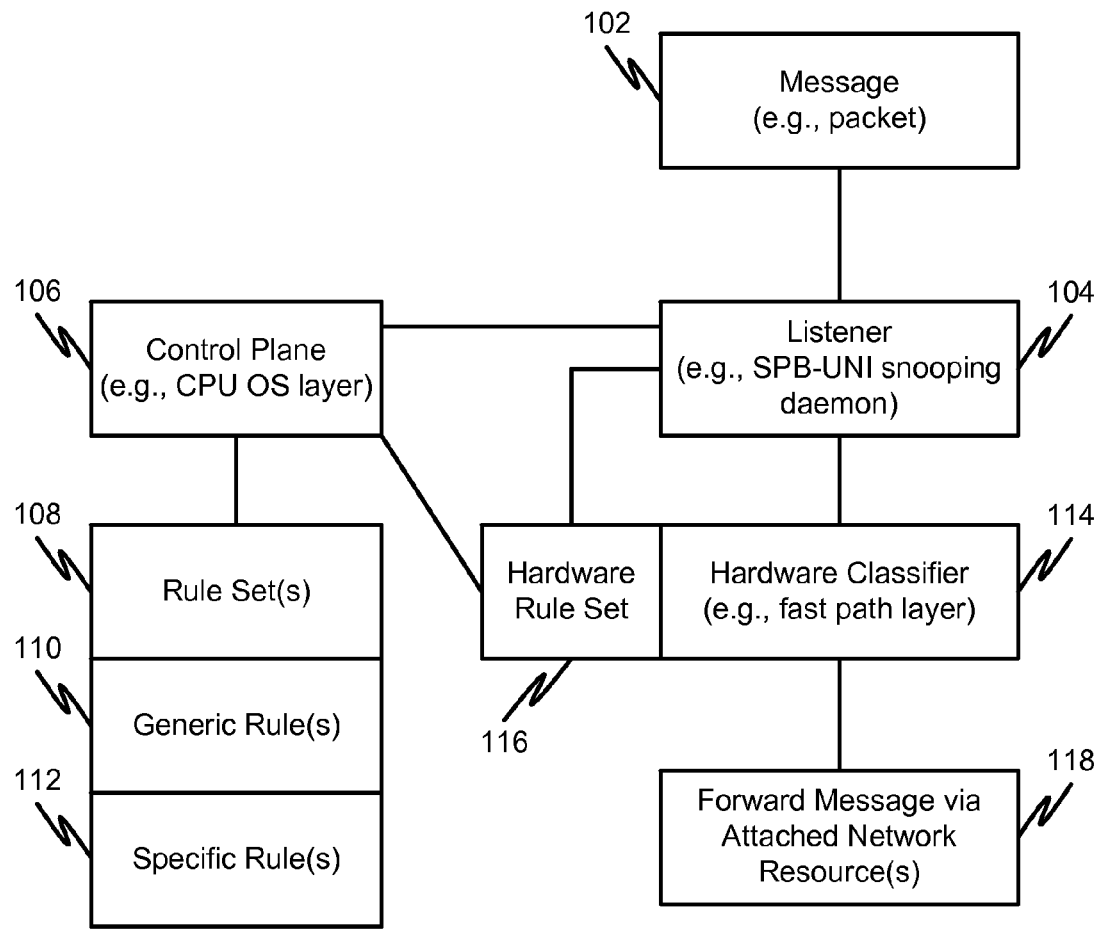
FIG. 1 is a diagram of an example network environment for host discovery and attach in accordance with at least one implementation.

In general, some implementations can provide dynamic attachment of hosts (e.g., SPB) to services (e.g., ISID) via one or more rule sets. The dynamic attachment can include a snooping method to discover and attach virtual devices to network resource without using any additional protocols to detect service end-points. For example, some implementations can include a new SPB-UNI functionality having specific snooping capabilities. These snooping capabilities can permit a switch to dynamically attach an edge device (e.g., a virtual machine or VM) to appropriate network resources based on a given policy, which can be pre-defined. An SPB-UNI snooping interface can be configured to "listen" to incoming message (or packet) traffic and determine whether the switch should forward the traffic onto the correct SPB Service Instance (ISID) based on a pre-defined rule set.

Some implementations can include a generic policy in which most (or all) VLANs are attached to VSNs based on a generic mapping rule-set (e.g., for a one-domain deployment). Alternatively, or in addition to the generic policy, the system can include a set of rules that allow attaching to different domains based on the ingressing VLAN or VXLAN IDs (or source type) in a "fine grain" or specific manner.

If a packet cannot be classified using hardware (HW) (e.g., a fast path layer), the packet can be sent to a CPU (e.g., a control plane system layer), where a snooping process (e.g., a UNI-snooping daemon) on the control plane can check the policy against the incoming communication request (e.g., packet) and program the HW accordingly to ensure that all subsequent packets are forwarded according to policy. Thus, the system can automatically attach virtual devices to an appropriate network resource and update the HW programming so future packets to/from the virtual device are handled using the relatively fast HW processing.

Some implementations can be largely vendor implementation independent, with only packet format information needed for the snooping interface (e.g., VLAN, VXLAN, NVGRE, STT and the like). In particular, some implementations can provide a solution for VLAN and VXLAN.

Some implementations can provide a simple, automated and generic solution for mapping and transporting network traffic (e.g., VLAN and VXLAN traffic) originating from virtualized environments (e.g., virtual machine (VM), vSwitch, and the like) via fabric virtual service networks (VSNs). Further, some implementations can provide a separation of concerns relative to the management domains (e.g., networking vs. compute) allowing the domains to co-exist in an independent model without requiring per event coordination between networking and compute operations teams thus delivering short service delivery times and significantly reduced operational expenses by reducing coordination and fault domains.

For example, an implementation can permit a VMware environment in which server operations staff uses VMware vCenter to add, move, change and delete VMs while the network automatically provisions the required services based on pre-defined policies without any need for complex, per event coordination between networking and compute operations teams.

Further, the UNI-snooping function does not necessarily replace solutions such as Avaya Virtual Provisioning Services (VPS), Fabric Attach/Auto Attach (FA), VXLAN-GW, SDN or the like, but rather can work in conjunction with one or more of these solutions. For example, a UNI-snooping solution can be configured to work with VPS where VPS documents all VM move activities. In such an implementation, VPS would not have to actually program the switch ports anymore, but rather could leave that programming task to the switches themselves. This can increase the scaling and speed of a solution dramatically.

In some implementations, UNI-snooping can extend the auto-attachment functionality beyond specific (e.g., VMWare only) deployments to any kind of VM deployments and thus provide a multi-functional solution. In some implementations, UNI-snooping can be configured to provide VXLAN GW capabilities of the switch hardware in a VXLAN environment.

UNI-snooping may not replace FA because UNI-snooping is only targeted at the server edge and would not be applicable for some deployments (e.g., campus riser deployments where VLAN memberships are very rarely changing). SDN deployments can benefit from UNI-snooping as well by removing the need for the SDN controller to own the responsibility to tie the compute/storage resources to the network resources, but rather focus on the higher level bindings and applications needs.

Because UNI-snooping interface functionality is based on actual traffic to determine actual service provisioning, it can also work seamlessly in a blade server/switch environment, for example when the blade switch has been put into a transparency mode. This implementation can permit the network UNI-snooping port to determine whether the service should be made available or not. UNI-snooping could also be extended to support a FC Jeda solution seamlessly, for example.

FIG. 1 is a diagram of an example network environment for host discovery and attach in accordance with at least one implementation. In particular, the network environment 100 includes a received message 102, a listener 104, a control plane 106, one or more rule/policy sets 108 including generic rules/policies 110 and/or specific rules/policies 112, a hardware classifier module 114, hardware rule set 116, and a forwarded message 118.

In operation, the message 102 is received. The listener module 104 can be set up to listen to a given domain (e.g., ID & NAME) and associated ports (SWITCH/PORT) and to snoop the message to determine if the message can be processed by the hardware classifier module 114 (or hardware processing layer or a fast path layer, see, e.g., flowchart section 203 of FIG. 2). During the snooping process, the listener module 104 can reference the hardware rule set 116 directly or via reference or by copy.

If the message 102 can be processed by the hardware processing layer 114, the message 102 is processed according to the logical attachment between the source of the message (e.g., a VM) and a network resource (e.g., an ISID) stored in the hardware rule set 116. If the message 102 cannot be processed by the hardware classifier module 114, then the message 102 is sent to a control plane layer (or system) 106 (e.g., a software application layer executing on a processor, see, e.g., flowchart section 207 in FIG. 2).

At the control plane layer 106, the message 102 is analyzed and compared against a rule/policy set 108. Based on the rule/policy set 108, an entry for the hardware rule set 116 can be generated and stored in the hardware rule set 116. The message 102 (e.g., VXLAN/VLAN traffic) can then be processed by the hardware layer 114 and forwarded 118 according to the attached network resource (e.g., ISID).

Figure 2:
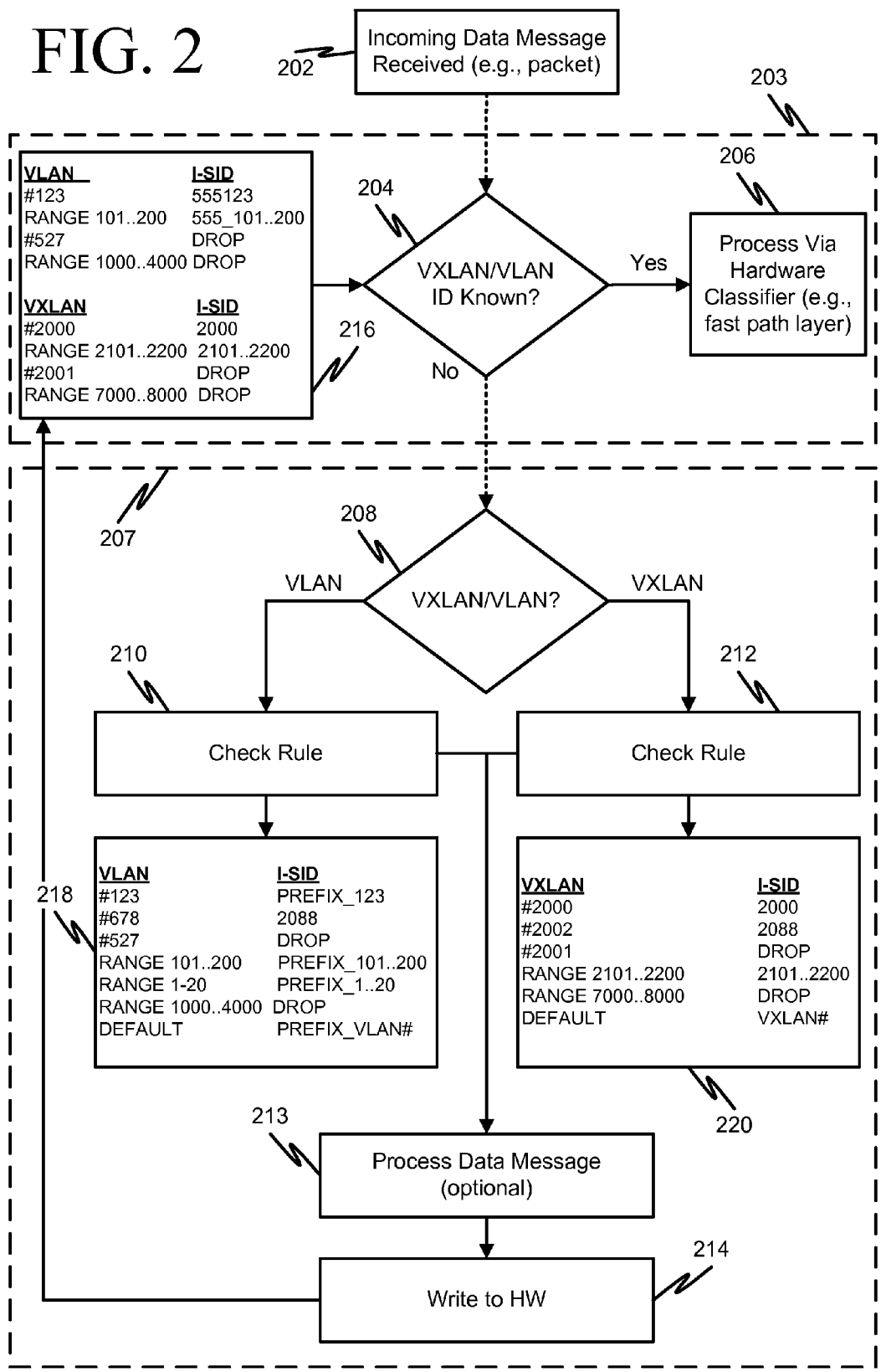
FIG. 2 is a flowchart of an example method of host discovery and attach in accordance with at least one implementation.

FIG. 2 is a flowchart of an example method of host discovery and attach in accordance with at least one implementation. Processing begins at 202, where a message such as a VXLAN or VLAN packet is received. Processing continues to 204.

At 204, it is determined whether a source ID (e.g., the VXLAN/VLAN ID) of the received message is known. For example, a listener or snooping interface (e.g., 104) can be used to determine whether the received message is known and thus can be processed by a hardware fast processing layer (203). If the message can be processed by a hardware processing layer, processing continues to 206. Otherwise, processing continues to 208, where a control plane (or CPU processing) layer 207 handles the received message.

At 206, the message is processed by a hardware processing layer.

At 208, a source type of the message is determined. For example, it is determined whether the message is a VXLAN or VLAN source type. If the message is a VLAN message, then processing continues to 210. If the message is a VXLAN message, then processing continues to 212.

At 210, the rules for the VLAN message type are referenced to determine how to handle this type of message. The message source type and source information are used to determine which rule of the VLAN rule/policy set 218 are applicable. Processing continues to 214.

At 212, the rules for the VXLAN message type are referenced to determine how to handle this type of message. The message source type and source information are used to determine which rule of the VXLAN rule/policy set 220 are applicable. Processing continues to 213.

At 213, the message is optionally processed. The processing can include forwarding the message or dropping the message. Processing continues to 214.

At 214, the processing rule to process the message (e.g., attach traffic from the message source to a network resource) is written to the hardware processing layer rule set 216.

202-214 can be repeated in whole or in part in order to accomplish a contemplated host discovery and attach operation.

An example host discovery and attach configuration file for the system shown in FIG. 1 or the method shown in FIG. 2 can include:

GLOBAL: ENABLE/DISABLE (default); VXLAN, VLAN or both

GLOBAL: "Snooping" Domain (ID & NAME) and associated ports (SWITCH/PORT)

PER DOMAIN: I-SID prefix for VLAN ID to I-SID mapping

PER DOMAIN: Rules

VLAN/VXLAN Ranges to accept

VLAN/VXLAN Ranges to drop

DEFAULT behavior (accept and map/drop)

PER DOMAIN: Timeout (default 0.5d)

(OPTIONAL) PER DOMAIN with optional per port override: SECURITY

Figure 3:
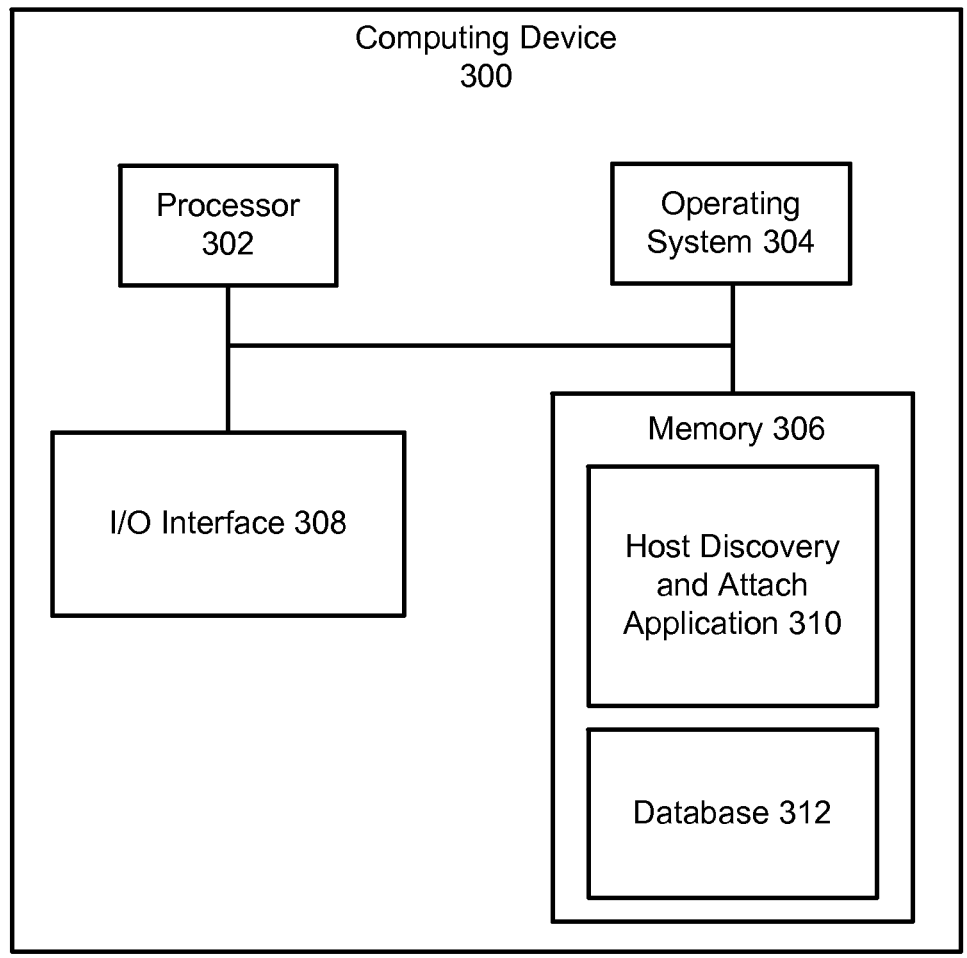
FIG. 3 is a diagram of an example computer system for host discovery and attach in accordance with at least one implementation.

FIG. 3 is a diagram of an example computer system 300 in accordance with at least one implementation. The computer system 300 includes a processor 302, operating system 304, memory 306 and I/O interface 308. The memory 306 can include a database for host discovery and attach application 310 and a database 312 (e.g., configured to store host discovery and attach rules and/or policies, or the like).

In operation, the processor 302 may execute the application 410 stored in the memory 306. The application 310 can include software instructions that, when executed by the processor, cause the processor to perform operations for building and using a location database for service discovery in accordance with the present disclosure (e.g., performing one or more of steps 202-214 described above). The application program 310 can operate in conjunction with the database 312 and the operating system 304.

In one configuration and application example implementation, a network environment can include hypervisors and VMs with distributed vSwitches, standalone hypervisors and VMs, physical servers connected though VLAN, and a fabric connect infrastructure.

In operation, a network administrator can configure a "Snooping Domain" or snooping interface (e.g., SPB-UNI snooping interface) and assigns the ports hosting VMs with relevant policies. A switch, on the fabric UNI, detects VXLAN traffic. The switch can then create a rule and map the VXLAN traffic to the I-SID based on policy and rules. Network Admin maps VLAN 200 to I-SID for physical server.

In another example, a multi-tenant environment includes hypervisors and VMs controlled by a first tenant and hypervisors and VMs controlled by a second tenant, all connected by a fabric connect infrastructure. In operation, a network administrator configures two "Snooping Domains" (one for each tenant) and assigns the ports with relevant policies.

The multi-tenant example configuration can also be applicable for one tenant with multiple domains (e.g., DCs, organizations, and the like), and for one tenant with multiple solutions in one DC (e.g., KVM, VMW, Microsoft, and the like).

In another multi-tenant configuration and operation example, a system administrator can creates two VM instances from a VM management platform and assign them to a first VLAN (e.g., VLAN 100). In operation, switches on the fabric UNI detect traffic on the first VLAN and create and map VLAN 100 to an I-SID based on policy and rules. It will be appreciated that in many environments there may be blade servers with blade switches and/or 3rd party TOR switches. The example multi-tenant configuration can support all these switch/server configurations little or no additions or changes.

In yet another multi-tenant configuration and operation example, a system administrator creates two VM instances from a VM management system and assigns them to a first VXLAN (e.g., VXLAN 2100). In operation, switches on the fabric UNI detect VXLAN 2100 traffic and create and map VXLAN 2100 to an I-SID based on policy and rules. As a result, connectivity between the VMs can be established automatically based on snooping domain policies. VM management domains can be completely detached from the network.

In a VMware/Vswitch configuration and operation example, the network environment can include hypervisors and VMs controlled by VMW vSphere and dvS, for example. The network environment can include a fabric connect infrastructure.

In operation, a network administrator can configures a "Snooping Domain" and assigns the ports with relevant policies.

The system administrator can configure ESX clusters and can either a) instruct the dvs to use a specific VLAN ID (e.g., VLAN #2000) to tunnel VXLAN traffic over the physical network or b) not configure the VLAN ID. In case a), switches on fabric UNI detect VLAN #2000 traffic, create and map to I-SID based on policy and rules. Also, vSphere directed VXLAN traffic can be tunneled over VLAN #2000.

In another example, a network environment includes VMware distributed Vswitches in which hypervisors and VMs are controlled by VMW vSphere and dvS. The example environment can also include a fabric connect infrastructure.

In operation, a network administrator configures a "Snooping Domain" (e.g., an SPB-UNI snooper) and assigns the ports with relevant policies. In operation, a system administrator configures ESX clusters and can either a) instruct the dvs to use a specific VLAN ID to tunnel VXLAN traffic over the physical network or b) not configure the VLAN ID. In the case of a), switches on the fabric UNI, detect VLAN traffic via the snooping domain and create and map to I-SID based on policy and rules. vSphere directed VXLAN traffic is tunneled over the VLAN.

In the case of b), no VLAN ID is configured. Switches on the fabric UNI detect VXLAN IDs, and create and map to I-SIDs based on policy and rules.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for discovering edge devices within a network and establishing connectivity between the edge devices and one or more corresponding network services.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
   snooping a received packet to determine whether a source entity of the received packet is known and to determine whether the received packet can be handled by a first processing layer based on a rule set in the first processing layer and configured to be accessed by the first processing layer;
   classifying the packet at the first processing layer when the packet can be handled by the first processing layer;
   forwarding the packet to a second processing layer when the packet cannot be handled by the first processing layer;
   identifying a source type of the received packet at the first processing layer;
   determining, at the second processing layer, a predefined processing rule applicable to the received packet based on the source type of the received packet and source information of the received packet;
   applying the determined rule to logically attach the source entity of the received packet with one or more network resources;
   updating the rule set in the first processing layer to include the determined processing rule for the received packet; and
   processing the received packet in the first processing layer according to the updated first rule set.

2. The method of claim 1, wherein the snooping includes snooping with an SPB-UNI snooping interface.

3. The method of claim 1, wherein the source entity is a virtual entity.

4. The method of claim 1, wherein the first processing layer is a hardware fast path processing layer.

5. The method of claim 1, wherein the second processing layer is a control plane processing layer.

6. The method of claim 1, wherein the source type includes one of VXLAN and VLAN.

7. A system comprising one or more processors configured to perform operations including:
   snooping a received packet to determine whether a source entity of the received packet is known and to determine whether the received packet can be handled by a first processing layer based on a rule set in the first processing layer and configured to be accessed by the first processing layer;
   classifying the packet at the first processing layer when the packet can be handled by the first processing layer;
   forwarding the packet to a second processing layer when the packet cannot be handled by the first processing layer;
   identifying a source type of the received packet at the first processing layer;
   determining, at the second processing layer, a predefined processing rule applicable to the received packet based on the source type of the received packet and source information of the received packet;
   applying the determined rule to logically attach the source entity of the received packet with one or more network resources;
   updating the rule set in the first processing layer to include the determined processing rule for the received packet; and
   processing the received packet in the first processing layer according to the updated first rule set.

8. The system of claim 7, wherein the snooping includes snooping with an SPB-UNI snooping interface.

9. The system of claim 7, wherein the source entity is a virtual entity.

10. The system of claim 7, wherein the first processing layer is a hardware fast path processing layer.

11. The system of claim 7, wherein the second processing layer is a control plane processing layer.

12. The system of claim 7, wherein the source type includes one of VXLAN and VLAN.

13. A nontransitory computer readable medium having stored thereon software instructions that, when executed by one or more processors, cause the one or more processors to perform operations including:
   snooping a received packet to determine whether a source entity of the received packet is known and to determine whether the received packet can be handled by a first processing layer based on a rule set in the first processing layer and configured to be accessed by the first processing layer;
   classifying the packet at the first processing layer when the packet can be handled by the first processing layer;
   forwarding the packet to a second processing layer when the packet cannot be handled by the first processing layer;
   identifying a source type of the received packet at the first processing layer;
   determining, at the second processing layer, a predefined processing rule applicable to the received packet based on the source type of the received packet and source information of the received packet;
   applying the determined rule to logically attach the source entity of the received packet with one or more network resources;
   updating the rule set in the first processing layer to include the determined processing rule for the received packet; and
   processing the received packet in the first processing layer according to the updated first rule set.

14. The nontransitory computer readable medium of claim 13, wherein the snooping includes snooping with an SPB-UNI snooping interface.

15. The nontransitory computer readable medium of claim 13, wherein the source entity is a virtual entity.

16. The nontransitory computer readable medium of claim 13, wherein the first processing layer is a hardware fast path processing layer.

17. The nontransitory computer readable medium of claim 13, wherein the second processing layer is a control plane processing layer.

18. The nontransitory computer readable medium of claim 13, wherein the source type includes one of VXLAN and VLAN.

19. The nontransitory computer readable medium of claim 13, wherein logically attaching the source entity of the received packet with one or more network resources includes logically attaching network traffic from a source network to a network service identifier (ISID).

20. The nontransitory computer readable medium of claim 19, wherein the source network includes one of VXLAN and VLAN.

* * * * *